Dec. 12, 1967 — H. E. BADER — 3,357,372
CARGO HANDLING SYSTEM
Filed July 2, 1963 — 2 Sheets-Sheet 1
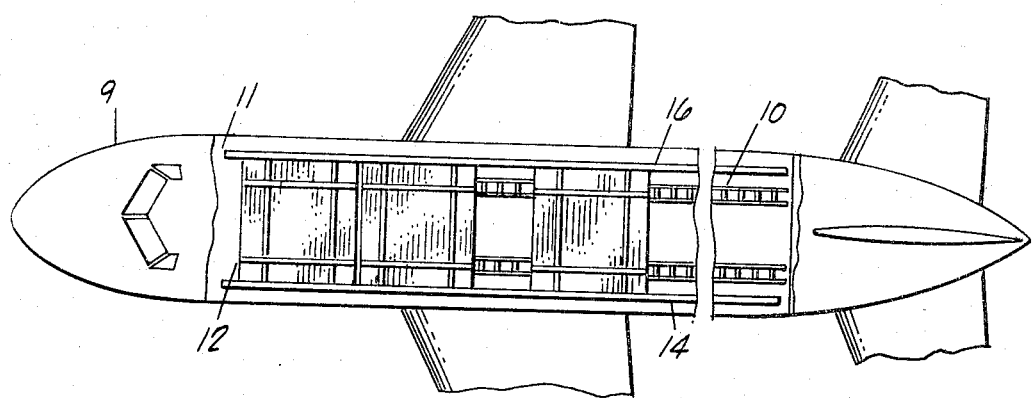
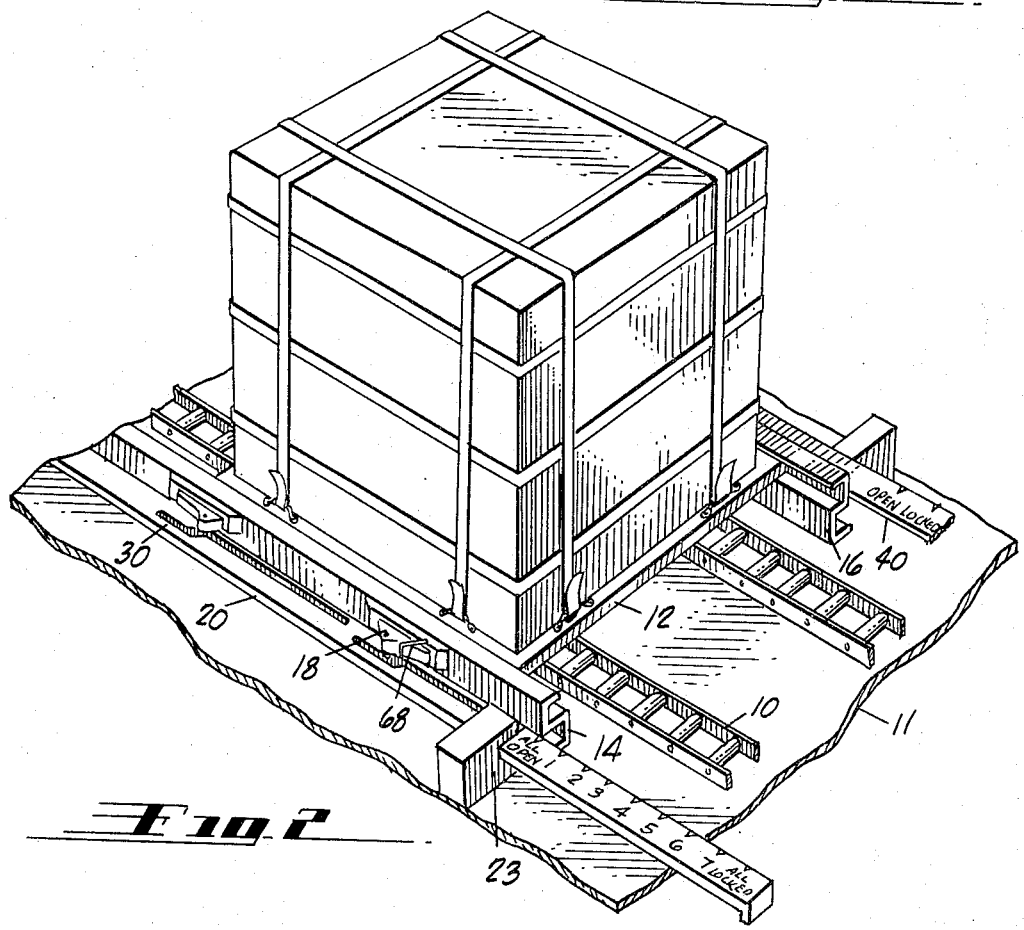
INVENTOR.
HOWARD E. BADER
BY Donald L. Ryer
AGENT

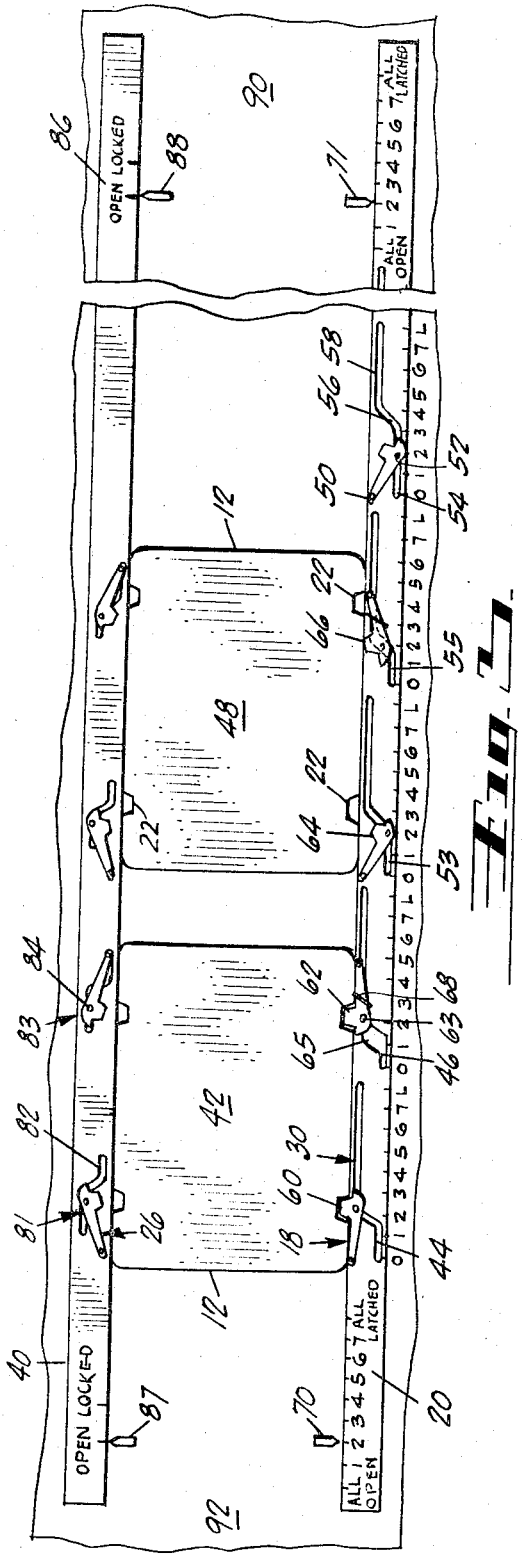

United States Patent Office 3,357,372
Patented Dec. 12, 1967

3,357,372
CARGO HANDLING SYSTEM
Howard E. Bader, Long Beach, Calif., assignor, by mesne assignments, to McDonnell Douglas Corporation, Santa Monica, Calif., a corporation of Maryland
Filed July 2, 1963, Ser. No. 292,416
2 Claims. (Cl. 105—369)

This invention relates to cargo handling systems and more particularly to systems for holding palletized cargo, especially in airplanes.

Cargo to be transported is often loaded on pallets to enable the easier handling thereof. The loading and fastening of heavy pallets in an airplane is often accomplished by pushing each pallet along rails until it is in the desired location and then tying it down with straps or locking pins. There are many difficulties encountered with this method of securing the pallets.

One problem encountered is that in presently used systems considerable time and effort are required to position each pallet and hold it in the proper position while it is being secured. Usually at least two men are required: one to hold the pallet and another to tie it down. Furthermore, aircraft with nose gears tend to "nose down" during loading operations, while aircraft with tail wheels slope in the other direction. To hold steady a pallet weighing perhaps 5 tons on an inclined rail while it is being tied down is very difficult.

Another problem encountered with present systems is that there is little space around the pallets for workmen to maneuver in while securing pallets. In order to save space for cargo, little room is left in airplanes for workmen. Accordingly, the securing or releasing of pallets is very tedious and time consuming, and is likely to result in injuries.

Still another difficulty encountered in the use of present systems is that they do not enable the easy release of cargo during flight as in air-dropping supplies or in dumping all cargo in an emergency. Generally, flight personnel must work near an open door in releasing those pallets stored nearest the door. As a result, there is considerable danger that personnel will be swept out the open door, especially because the area around the pallets is small. Furthermore, it is often desirable to be able to release pallets of cargo in quick succession in air delivery or in an emergency, and considerable time is required to unfasten each pallet and release it.

Various schemes have been proposed for holding cargo in trains, warehouses, and the like which involve the simultaneous securing and release of all pallets at once. These systems are not adequate where the surface on which the pallet moves is not always level during loading as in an airplane. Thus, a system is required which will allow the securing and releasing of one pallet at a time.

This invention provides a simple cargo holding system wherein pallets of cargo are individually fastened or released by means of a control device operable from either end thereof. In several embodiments, the system comprises notched pallets which are held at various locations along a rail by a series of spring biased latches. The operation of the latches is controlled by a long cam which runs the length of the rail, and which has many positions which provide for the fastening and releasing of each pallet individually.

The cam of the invention can be moved along its length into a number of positions. In a first cam position, all latches except one are held away from the path taken by the pallets so that a pallet can be sent along the rails all the way to the end of the cargo space without interference. The one remaining latch, located near the end of the cargo space, is held in a ratchet position wherein it can move into or out of engagement with a pallet notch. This latch rides over the pallet when it is moving into the cargo storage area, but locks into a notch in the pallet if it should start to move backward. Accordingly, once a pallet is pushed forward all the way into the cargo storage area, it cannot move backward.

The cam is next moved into a second position wherein a second latch locks into the first pallet to prevent its movement either forward or backward, to thus securely hold it in place. At the same time, a third latch is moved into a ratchet position to hold against backward movement a second pallet which is pushed into position behind the first pallet. The cam is successively moved into further positions as pallets are loaded until loading is completed.

After all pallets are pushed into the cargo space and held by the first set of latches, a second cam on an opposite rail is operated so as to simultaneously engage another set of latches with another set of notches on the pallets. The second set of latches securely holds the pallets tgainst large forces which may be encountered in flight.

The cams which operate each set of latches can be operated from either end of the cargo storage area. This allows for the easy operation of the system with a minimum of personnel.

Although the system is especially useful in cargo airplanes, it is also very useful in numerous other cargo storage applications, as in warehouses, trucks, trains and ships.

Accordingly, one object of the invention is to provide a cargo handling system in which the fastening and releasing of each parcel of cargo is accomplished individually of other cargo parcels.

Another object of the invention is to provide a simple cargo holding system in which pallets of cargo are fastened and released semi-automatically.

A further object of the invention is to provide a cargo holding system for use in a cargo storage area in which the fastening and release of pallets of cargo is accomplished from either end of the storage area.

A still further object of the invention is to provide a simple cargo holding system in which pallets of cargo are fastened in the order in which they are loaded and are unfastened in the reverse order.

These and other objects and a fuller understanding of the invention may be had from the following description and claims taken in conjunction with the accompanying drawings in which:

FIGURE 1 is a partially sectional plan view of one embodiment of the invention shown in connection with an airplane.

FIG. 2 is a partial perspective view of the invention.

FIG. 3 is a partial top elevation view of the invention.

The embodiment of the invention shown in FIG. 1 includes an aircraft fuselage 9 having a floor 11 on which is mounted a pair of rails 14 and 16 for confining the movement of cargo carrying pallets 12 and rows of rollers 10 for supporting the pallets 12. A number of latches located along each rail are provided to hold the cargo carrying pallets 12 in place. The latches are operated by two cams which also are located along each rail. The embodiment shown in FIG. 1 is shown in greater detail in the partial pictorial illustration of FIG. 2 and the partial plan view of FIG. 3.

The airplane floor 11 which holds the cargo handling system supports the pair of rails hereinafter referred to as the left rail 14 and right rail 16. A series of sequencing latches 18 located at spaced positions along the left rail 14 holds the pallets 12 at predetermined locations along the rails by means of the engagement of the latches 18 with notches 22 formed in the sides of the pallets. The sequencing latches 18 provide for the latching of pallets in the sequence in which they are loaded into the system and for their unlatching in the reverse order. A sequencing cam 20 extending the length of the left rail 14 operates the sequencing latches 18.

A series of locking latches 26 are located at spaced positions along the right rail 16. These latches 26, which are operated by a locking cam 40, positively lock all pallets after they have been positioned and restrained by the sequencing latches 18. The series of locking latches 26 provide additional means for holding the pallets in place.

The sequencing cam 20 which operates the sequencing latches 18 is a long bar which slides within several support bearings 23 located at intervals along the rails 14 and 16. The cam 20 has several sets of grooves 30 formed therein for operating the latches 18, each set of two grooves, such as grooves 44 and 46, operating two latches 60 and 62 which serve to hold one pallet.

Each latch is pivotally mounted onto the rail at pivot points 50, and each latch carries a cam follower 52 which engages a groove in the sequencing cam 20. Each of the several sets of grooves in the cam 20 corresponds to a pallet to be held. Corresponding to the first pallet position 42 is a forward groove 44 and a rearward groove 46. Corresponding to the second pallet position 48 is a forward groove 53 and rearward groove 55.

Each groove comprises an open-latch length 54, a closed-latch length 58, and a connecting length 56. When a cam follower 52 engages an open length 54, it is moved out of engagement with the pallet notches 22. When a cam follower 52 engages a closed length 58 of a groove, the follower is moved into locking engagement with the notches 22 formed in the pallets.

The connecting length of the forward groove of each pallet position, such as in grooves 44 and 53, are narrow and move the corresponding latches 60 and 64 from a position of disengagement with the notches 22 of the pallet to a position of positive engagement therein. The connecting length of the rearward groove of each pallet position, such as in grooves 46 and 55, are wide and allow the corresponding latches 62 and 66 to "ratchet," that is, to move freely into or out of engagement with the notches 22 of the pallets. Each of the rearward latches, such as latches 62 and 66, are spring biased by a spring 68 toward a position of engagement.

Each end of the sequencing cam 20 has numbers imprinted thereon to indicate which pallet positions are in an engaged state, or, i.e., which have latches that are projecting into or are free to move into notches in the pallets. Thus, for a system designed to hold 7 pallets, the numbers 1 through 7 have been applied at each end of the cam 20. A position labeled "all open" also appears, to indicate that no pallet position is engaged. The pallet position which is in engagement is indicated by pointers 70 and 71 fixed to the airplane floor 11.

The right rail 16 bears a series of locking latches 26 which engage notches 22 in the pallets to securely lock the pallets in place. These latches 26 are all engaged simultaneously, and only after all of the pallets are already held by the sequencing latches 18.

The locking latches 26 situated along the right rail 16 are operated by a locking cam 40. The locking cam has numerous grooves 82 which engage cam followers 84 mounted on the latches 26. The cam 40 has markings 86 at either end which indicate one of two cam positions. In one position indicated by the word "locked," all latches engage the notches 22 and lock the pallets 12 in place. In the other position indicated by the word "open," all latches are disengaged from the notches. Indicators 87 and 88 fixed to the floor of the airplane indicate which of the two cam positions the cam 40 is in.

In order to load cargo carrying pallets 12 into the airplane, the locking cam 40 is pushed to its "open" position so that all locking latches 26 are held away from the path of the pallets 42, 48, etc. The sequencing cam 20 is placed in its "1" position, that is, it is moved so that the pointers 70 and 71 point at the "1" mark on the cam 20. When the sequencing cam 20 is placed in the "1" position, all sequencing latches 18 are held away from the path of the pallets by reason of the engagement of the cam followers 52 in the open length 54 of each groove, except for the rearward latch 62 of the first pallet position 42.

When the cam 20 is in position "1," the cam follower 63 of the latch 62 lies in a connecting groove portion 65. This groove portion is wide, and allows the cam follower to move freely so that the latch 62 can move toward or away from engagement with a notch 22 in a pallet. Inasmuch as the latch 62 is spring biased toward the path of the pallets 12, by the spring 68, it tends toward engagement with a notch 22 unless pushed out of the way.

A first cargo-bearing pallet is loaded by placing it between the rails 14 and 16 and upon the rollers 10 at the rearward or loading end 90 of the system. The pallet is then pushed toward the forward end 92 of the system.

The pallet encounters no latches until it passes the ratcheted latch 62. When the rounded front of the pallet 12 encounters the latch 62, it pushes the latch aside, and the pallet is free to move toward the forward end 92 of the system. Once the pallet is pushed so far that it is in the first pallet position 42, the latch 62 rests within the notch of the pallet. The pallet cannot move backward toward the loading end 90 because backward force on the latch 62 merely forces it further into the notch and prevents movement of the pallet. If the pallet moves too far toward the forward end 92 of the system, the latch 62 will be pushed out of the way inasmuch as such force on the latch 62 tends to pivot it out of the notch.

Once the first pallet is held by the latch 62, the cam 20 is moved to its "2" position wherein the pointers 70 and 71 point to the number 2 at each end of the cam 20. This position of the cam 20 is the state of the system shown in FIG. 3. Moving to the "2" position causes the forward latch 60 of the first pallet position 42 to move into positive engagement with the forward notch of the pallet. In addition, the rearward latch 62 is also locked into place in a notch.

Movement of the cam 20 to the "2" position also places the rearward latch 66 of the second pallet position 48 into ratchet, wherein the latch can move into or out of engagement with a notch of a pallet. Thus, when a second pallet is placed on the rollers 10 and between the rails 14 and 16 at the loading or rearward end 90 of the system, and pushed toward the forward end 92, the second latch 66 rides over it. Once the second pallet is in the second pallet position 48 wherein the second latch 66 engages a notch 22, the second pallet cannot roll backward.

The cam 20 is then moved into the "3" position, which causes the forward latch 64 of the second pallet position 48 to move into engagement with the notch 22 and firmly hold the second pallet. The second latch 66 of the second pallet position is also moved into rigid engagement with a notch 22. Simultaneously, a second ratchet of the third pallet position (not shown) is placed into a ratcheted state so as to permit the retention of a third pallet.

Additional pallets are loaded and the cam 20 is moved to new positions in an manner similar to that described above. Finally, after seven pallets are loaded, the cam 20 is moved into the "all latched" position wherein all latches 18 on the left rail 14 are held within a notch 22 so that all pallets are held firmly.

Although the latches along the left rail 14 hold the pallets when the cam 20 is in an "all latched" position, additional securing may be necessary to prevent movement of the pallets during flight when large shocks may be encountered. Accordingly, a second secries of latches 26 along the right rail 16 is provided to obtain further securing. Once all pallets are securely held in position in the manner described hereinbefore, the cam 40, situated along the right rail 16, is moved from the "open" position to the "locked" position. This causes all cam followers 84 to move the latches 26 into firm engagement with the notches 22 along the right side of each pallet. The latches 26 along the right rail then hold the pallets securely, providing the additional holding needed for restarint against high g loads.

In order to unload the cargo secured in the manner described hereinbefore, the locking cam 40 situated along the right rail 16 is first moved into the "open" position wherein all latches 26 are moved out of engagement with notches 22 in the pallets. Next, the sequencing cam 20 is moved from the "all latched" position to the "6" position. This moves the two latches of the last or rearwardmost pallet position out of engagement with the notches of the last pallet, to allow the pallet to be pushed backward along the rails and out of the cargo storage area. After the last cargo-bearing pallet is unloaded, the latch 20 is moved to the "5" position to release the next to last pallet. This process is continued until the cam 20 is moved to the "all open" position wherein the first pallet is released and can be pushed or allowed to slide backward along the rails and out of the storage area.

The embodiment of the invention described hereinbefore shows a cam which may be operated by hand to move it into any one of a number of positions. This is sufficient for small systems, but for large cargo handling systems such as are to be found in large cargo planes, it is usually more desirable to provide a more powerful cam moving means, such as a rack attached to the cam. Such a rack can be moved by a pinion having a long handle attached in a ratcheting arrangement so that the handle may be moved back and forth to advance the rack in one direction.

Although a specific embodiment of the invention has been described, many changes can be made in the arrangement and design of the cams, latches, and other portions of the invention. Thus, it is desired to emphasize the fact that many further modifications may be resorted to in a manner limited only by a just interpretation of the following claims.

I claim:
1. In combination with a cargo handling system wherein a plurality of load supporting pallets are to be employed, said pallets are to be placed in an in-line arrangement and are to be held against movement, a latching assembly to effect the non-movement of the pallets comprising:
   a series of first latches and a series of second latches which are capable of cooperating to hold said pallets against movement, each of said pallets cooperating with one of said first latches and one of said second latches;
   a cam being movable to at least a first and a second position, said cam having means to sequentially operate said first and second latches, with said cam in said first position one of said first latches is capable of being engaged with a pallet while said second latches and the remaining first latches maintain a non-engageable position with said pallets, with said cam in said second position one of said first latches and one of said second latches cooperate to engage a pallet and another first latch is positioned to be engageable with another pallet.
2. An apparatus as defined in claim 1 wherein:
   said means to sequentially operate said first and second latches comprises a plurality of grooves in said cam there being one groove for each of said first and second latches, the distance between adjacent first latch grooves being different than the distance between adjacent first latches, the distance between adjacent second latch grooves being different than the distance between adjacent second latches, whereby a sequential operation of said first and second latches is achieved during movement of said cam.

References Cited
UNITED STATES PATENTS
2,692,744  10/1954  Burkhard _____ 244—137
2,774,560  12/1956  Johnson _____ 244—138

ARTHUR L. LA POINT, *Primary Examiner.*